May 30, 1944.    H. V. ALEXANDERSSON ET AL    2,349,838
MICROMETER
Filed Jan. 12, 1942    2 Sheets-Sheet 1
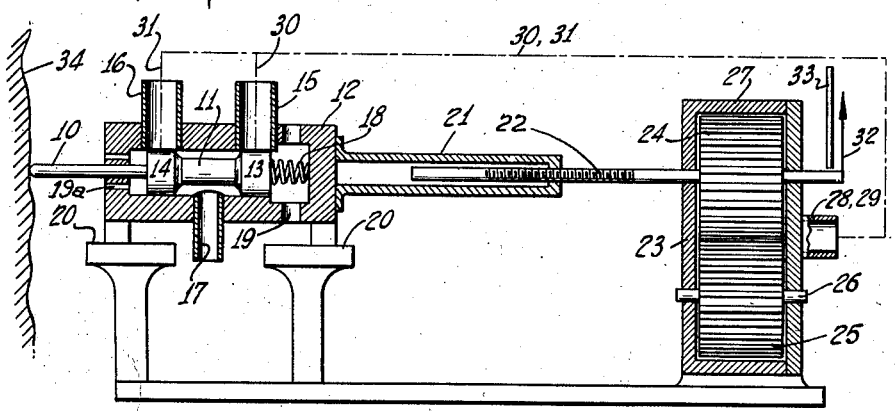
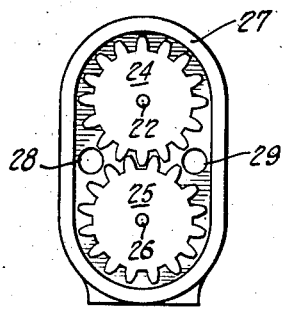
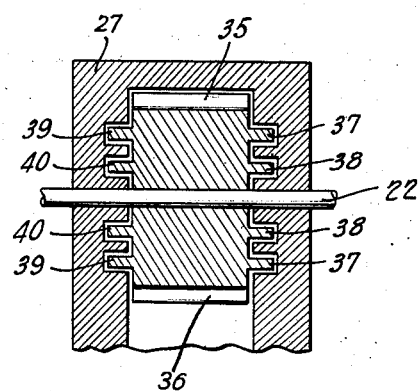
INVENTOR
HARALD VALDEMAR ALEXANDERSSON
and CARL-ERIK GRANQVIST
BY
their ATTORNEY

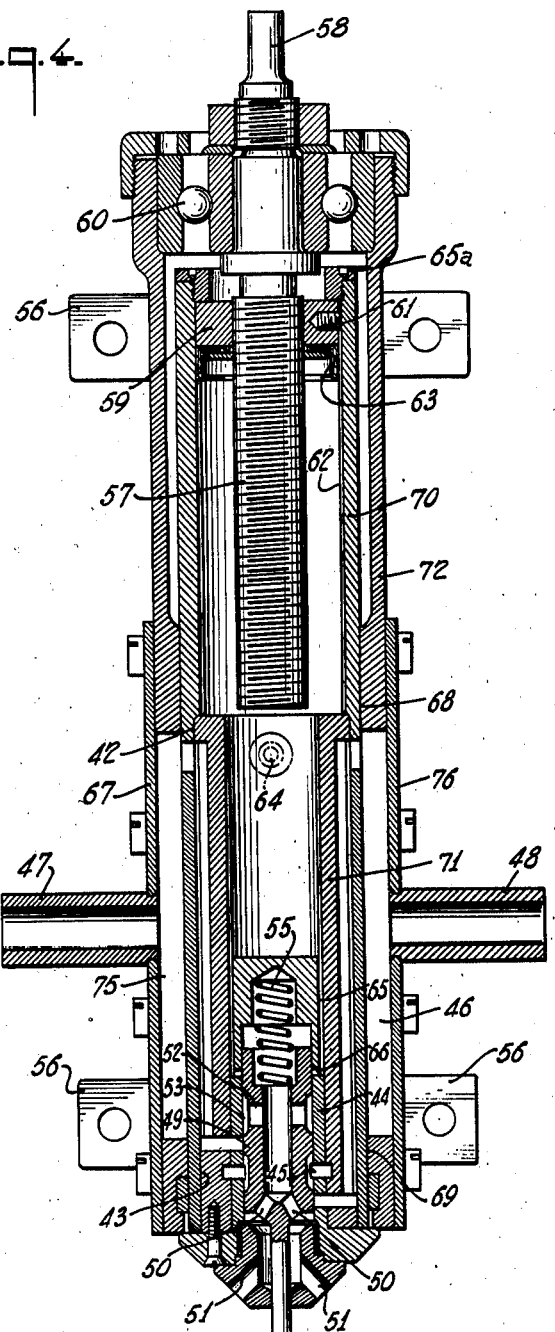

Patented May 30, 1944

2,349,838

UNITED STATES PATENT OFFICE 2,349,838

MICROMETER

Harald Valdemar Alexandersson, Lidingo, and Carl-Erik Granqvist, Stockholm, Sweden, assignors to Aga-Baltic Aktiebolag, Stockholm, Sweden, a corporation of Sweden Application January 12, 1942, Serial No. 426,462
In Sweden January 16, 1941

8 Claims. (Cl. 33—172)

Our invention relates to a micrometer.

The present invention refers to a micrometer device, which has by practical tests proved to have very advantageous properties with respect to precision and speed of control movement. A characteristic of the micrometer according to the invention is that the test means is connected with one part of a valve arrangement for pressure medium, for instance pressure air, the other part of which is under influence of a pressure medium motor in such a way that every movement of the first named part of the valve arrangement causes the motor to be operated for corresponding displacement of the second part of the valve arrangement, the movement of the motor consequently indicating the displacement of the first part with a high degree of precision.

The invention is below further described in connection with the annexed drawing, in which Fig. 1 shows the principle of the invention, Fig. 2 shows the turbine in a projection perpendicular to that in Fig. 1, Fig. 3 shows another form of execution of the turbine, and Fig. 4 shows the practical execution of the valve arrangement according to Fig. 1.

The test means according to Fig. 1 contains a pin 10, which is connected to a valve piston 11. The valve piston 11 is movably arranged in the interior of a valve housing 12 in such a way, that the two valve bodies 13 and 14 of the valve piston normally close the two ports 15 and 16 in the valve housing. Between these ports there is an inlet opening 17 for the pressure medium. Finally, in the interior of the valve housing there is provided a spring 18, which presses the valve piston and the test means outwardly from the valve housing. The chamber about the spring 18 communicates with the the atmosphere through openings 19, while openings 19a connect the space to the left of valve body 14 with the atmosphere.

The valve housing 12 is slidably mounted on supporting structure 20. The movement on support 20 is caused by a threaded shell 21 and a threaded bolt 22, arranged within it, said bolt being the shaft of a pressure medium operated gear motor 23. An end view of the gear motor 23 is shown in Fig. 2. It consists of two tooth wheels 24 and 25, the wheel 24 of which is mounted on the shaft 22, whereas the wheel 25 is arranged on a shaft 26, parallel thereto. The wheels 24 and 25 are arranged in a preferably close fitting housing 27, two ports 28 and 29 being provided in one end wall. These ports are connected by preferably flexible conduits 30 and 31 with the ports 15 and 16, respectively, of the valve housing 12.

One of the shafts 22 or 26 is connected to an arrangement for reading the movement of the turbine, in Fig. 1 schematically shown in the form of a pointer 32 and a dial 33.

The arrangement operates in the following manner: The test means 10 is put against the surface 34, which is to be tested whereby it will be moved axially in relation to the valve housing, either due to the pressure of the surface against the test means or by the pressure of the spring 18 against said means. It is assumed for instance, that the test means is moved against the action of the spring 18 in such a way, that the valve bodies 13 and 14 are displaced at the right in the figure. This will result in pressure medium from the inlet 17 being fed through the port 15 to the conduit 30 and the port 28 of the motor, whereas the port 29 of the turbine is connected to the atmosphere through the conduit 31, the port 16 and the openings 19a. The motor is caused to rotate in a manner known per se, and the shaft 22, due to its threaded engagement with the shell 21, displaces the valve slide in such a direction that the port 15 is again closed. When this condition is obtained, the motor stops, and the pointer 32 indicates on the dial 33 the movement of the motor, which is proportionate to the displacement of the test means 10, and the dial may be calibrated to indicate this displacement directly.

One of the factors making possible a very high precision of the above described device is that the threaded connection between shell 21 and shaft 22 may have extremely close tolerances even though this results in high friction because the gear motor 23 may be made to develop power ample to overcome such friction and to reliably control the micrometer. Due to the special properties of a motor of the present kind, moreover, the control force will assume its maximum value when the motor is practically stalled, provided that the valve port is open. Further the valve port opening will be only very small when the valve member is in the immediately vicinity of the correct control position, whereby the pressure medium is throttled and consequently dampens the movement of the turbine, whereby over-regulation is avoided in practice. This in connection with the fact that the mass of the movable parts of the turbine may be made small by constructing them of a suitable light-metal, causes a greater speed in the control movement, than could be obtained with hitherto known micrometer arrangements.

The above mentioned high maximum force at low speed of the gear motor is, however, to a great extent decreased, if the turbine is not well sealed, as a leakage of the pressure medium will cause a pressure drop in the interior of the motor with simultaneous decrease of the control force thereof. It is therefore of greater importance than usual, that the sealing of the motor housing is very good. In practice it has proved, that a fully sufficient sealing may be obtained in the most simple way by making the gear wheels with cylindrical side flanges, which cooperate with corresponding grooves in the motor housing, so that a labyrinth seal is obtained. This arrangement is shown in Fig. 3, where one of the gear wheels is shown having two teeth 35 and 36 and four cylindrical flanges 37, 38, 39 and 40. As is evident from the figure, grooves corresponding to the flanges are arranged in the motor housing 27.

In Fig. 4 a practical form of execution of a micrometer according to the invention is shown. The micrometer according to Fig. 4 is intended as a control instrument for a machine tool used in the fine-mechanical metal industry, but of course, the use of the instrument is not limited thereto.

The valve of the instrument is arranged in a substantially cylindrical housing 72, provided with covering plates 67 and 76 for providing air pressure channels. At sliding surfaces 68 and 69 in the housing 72 a cylinder 70 is so arranged, that it may be displaced in axial direction. Finally, in the cylinder 70 a further cylinder 71 is connected by screw threads at 42 and 43. The cylinder 71 carries the valve slide 44.

Four air pressure channels are present, all of them arranged in axial direction, but separated 90° around the periphery of the housing 72. The channel corresponding to the opening 17 in Fig. 1, the input opening of which is not visible in Fig. 4, is arranged in such a symmetrical manner, that it contains two of the above mentioned four channels, diametrically opposite to each other. These channels are also connected with a circular channel 45 in the valve slide 44. The two remaining channels 75 and 46 are connected with the ports 47 and 48, respectively, which correspond to the ports 15 and 16 in Fig. 1. The valve body 49 is hollow and its interior is connected by openings 50 and 51 with the atmosphere and is connected by openings 52 with a circular groove 53 in the valve body, which, upon the movement of the latter outwards in relation to the valve slide, will be connected with the channel 45.

The test means is indicated 54 and the spring, pressing the test means in direction outwards is indicated 55.

The valve arrangement according to Fig. 4 is further provided with four apertured flanges 56 for mounting the arrangement on the machine.

The arrangements for displacing the valve parts consists of a threaded bolt 57, arranged in the same piece as the shaft 58 of the pressure medium motor, and a threaded ring 59. The shaft 58 is in the back part of the valve arrangement carried by a ball bearing 60. The threaded ring 59 is arranged slidably within the cylinder 70, guided by means of a pin 61 in a groove 62 in the said cylinder. Further the ring 59 is provided with a packing 63 against the inner wall of the cylinder 70. In the cylinder 71 an opening 64 is arranged, which connects the interior of the cylinder with a supply channel for pressure air.

For description of the function of the arrangement it is assumed that the arrangement has been brought into vertical position over a working piece, the horizontal surface of which is worked. Hereafter air pressure is supplied. This will then flow through the opening 64 and rapidly fill the interior of the cylinders 70 and 71, a pressure in vertical direction thereby being applied to these cylinders. The stop-ring 65a, connected to the cylinder 70, will thereby be brought into contact with the threaded ring 59.

In this initial position the spring 55 presses the valve body 49 in direction outwards in relation to the slide 44 and consequently communication is opened from the ring-formed pressure medium channel 45 to the channel 46 and the port 48. The port 48 is in a manner, which was described in connection with Fig. 1, connected to the pressure medium motor, thus causing it to rotate. This rotation takes place in such a direction that the threaded ring 59 will be moved downwards by the bolt 57. The pressure air in the interior of the cylinders 70 and 71 will, however, cause a corresponding displacement of these cylinders as well as of the valve slide 44, the valve body 49 and the test means 54.

When the test means 54 by said movement is brought into contact with the working piece, continuous movement will no more take place, whereas on the other side the ring 59, the cylinders 70 and 71 and the valve slide 44 will continue their movement. The result will be that the valve body 49 within a short time is brought into the position of rest in relation to the valve slide 44, in which the air pressure input to the channel 46 is cut off. The pressure medium motor will then stop. The instrument is now in a position to function and every following displacement of the pin 54 in one or another direction will immediately cause a control movement, similarly as described in connection with Fig. 1.

If for some reason the supply of pressure medium should cease, also the air pressure in the interior of the cylinders 70 and 71 ceases, whereby the pressure of the pin 54 against the working piece will cease. The cylinders 70 and 71 may then without any impediment slide back, thereby avoiding any risk that the instrument may be subjected to too strong mechanical affects.

It may occur that the instrument is subject to so rapid movements, that the pressure medium motor can not effect the control movement with sufficient speed. If this results in the pin 54 being lifted from contact with the working piece, obviously no other disadvantage has taken place, than that an unevenness in the working piece has not been correctly registered. This error must, however, in the assumed case be so great, that it is possible to see by ocular control, and no special testing steps are in this case required. If, on the other hand, the pin 54 should be pressed in against action of the spring 55 during the above mentioned very rapid movement, a safety arrangement is provided, consisting of a channel 65 between the cylinder 71 and the valve slide 44 and the opening 66 in the valve slide. At the backwards movement of the valve body in the valve slide, at a predetermined displacement, connection will be opened between the otherwise closed chamber within the cylinders 70 and 71 and the atmosphere. This connection is established through the channel 65, the opening 66, the hollow interior part of the valve body and the openings 50 and 51. The pressure air in the interior of the cylinders 70 and 71 will then rapidly leak out this way. The opening 64, however, is constructed as an orifice and hence, the air pressure is subject to a relatively great pressure drop therethrough. The relatively unessential over-pressure in the interior of the cylinders 70 and 71, emanating in this case, should be lower than the pressure from the spring 55, and consequently the cylinders 70 and 71 will move upwards, thereby taking with it the valve slide 44 and to begin with also the valve body 49. This means a further safety against the instrument being subject to too strong mechanical effects.

The invention is, of course, not limited to the specific embodiments above described and shown in detail in the drawings, but substantial modifications thereof may be made within the scope of the invention as determined by the appended claims.

What is claimed:

1. In a micrometer, a valve having two relatively movable members, a work contacting pin connected to move one of said members as the pin is displaced by the work, a fluid pressure motor controlled by said valve, means for transmitting motion of said motor to the other of said valve members so that movement of said motor moves said other valve member in the same direction as the first member was moved by said pin so as to restore the original relative position of said members, and means for indicating the extent of movement of the motor.

2. In a micrometer, a piston valve having a movable cylinder member and a movable piston member, said cylinder having an inlet port and two outlet ports, means for introducing fluid under pressure into said cylinder through said inlet port, said ports being so arranged that relative movement of said members in one direction connects said inlet port to one of said outlet ports and relative movement in the opposite direction connects said inlet port to the other outlet port, a fluid pressure motor having one inlet port for movement of the motor in one direction and another inlet port for movement of the motor in the opposite direction, means for connecting each outlet port of the valve to an inlet port of the motor, a work contacting pin connected to move one of said valve members as the pin is displaced by the work, means for transmitting motion of said motor to the other of said valve members so that movement of said motor moves said other valve member in the same direction as the first valve member was moved so as to reestablish the original position of said members, and means for indicating the extent of movement of the motor.

3. A micrometer as defined in claim 1, including resilient means for urging said pin against the work.

4. In a micrometer, a piston valve having a movable cylinder member and a movable piston member, said cylinder having an inlet port and two outlet ports, means for introducing fluid under pressure into said cylinder through said inlet port, said ports being so arranged that relative movement of said members in one direction connects said inlet port to one of said outlet ports and relative movement in the oposite direction connects said inlet port to the other outlet port, a fluid pressure gear motor having ports on either side of the gears whereby the motor rotates in one direction when fluid is admitted through one port and rotates in the opposite direction when fluid is admitted through the other port, means for connecting each outlet port of the valve to a port of the motor, a work contacting pin connected to move one of said valve members as the pin is displaced by the work, means for transmitting motion of said motor to the other of said valve members so that rotation of said motor moves the other valve member in the same direction as the first valve member was moved so as to reestablish the original position of said members, and means for indicating the amount of rotation of said motor.

5. A micrometer as defined in claim 4 in which said gear motor has a housing formed with annular grooves, and annular flanges on the gears cooperating with said grooves to provide a labyrinth packing.

6. In a micrometer, a valve having two relatively movable members, a work contacting pin connected to move one of said members as the pin is displaced by the work, a rotary fluid pressure motor controlled by said valve, a threaded connection between said motor and the other of said valve members so that rotary movement of the motor moves said other valve member in the same direction as the first member was moved by said pin so as to reestablish the original relative position of said members, and means for indicating the amount of rotation of said motor.

7. In a micrometer, a piston valve having a movable cylinder and a movable piston, a work contacting pin connected to move said piston as the pin is displaced by the work, a rotary fluid pressure motor controlled by said valve, a plunger slidable with respect to said cylinder member, a threaded connection between said motor and said plunger so that rotation of said motor moves said plunger in the same direction as said piston was moved, means for confining fluid under pressure between said plunger and said cylinder whereby movement of the plunger moves the cylinder to reestablish the original relative position of said piston and cylinder, and means for indicating the amount of rotation of said motor.

8. In a micrometer, a piston valve having a movable cylinder, and a movable piston, a work contacting pin connected to move said piston as the pin is displaced by the work, a rotary fluid pressure motor controlled by said valve, a plunger slidable with respect to said cylinder member, a threaded connection between said motor and said plunger so that rotation of said motor moves said plunger in the same direction as said piston was moved, means forming a chamber for confining fluid under pressure between said plunger and said cylinder whereby movement of the plunger moves the cylinder to reestablish the original relative position of said piston and cylinder, means for indicating the amount of rotation of said motor, and port means controlled by a sudden excessively great displacement of said piston by said pin for relieving the fluid pressure within said chamber.

HARALD VALDEMAR ALEXANDERSSON.
CARL-ERIK GRANQVIST.